US006992583B2

(12) United States Patent
Muramatsu

(10) Patent No.: US 6,992,583 B2
(45) Date of Patent: Jan. 31, 2006

(54) VEHICLE POSITION COMMUNICATION SYSTEM, VEHICLE NAVIGATION APPARATUS AND PORTABLE COMMUNICATIONS APPARATUS

(75) Inventor: Toshihiko Muramatsu, Toyooka-mura (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/373,823

(22) Filed: Feb. 25, 2003

(65) Prior Publication Data

US 2003/0164778 A1 Sep. 4, 2003

(30) Foreign Application Priority Data

Feb. 27, 2002 (JP) ............................ P2002-052213

(51) Int. Cl.
*H04Q 7/00* (2006.01)
(52) U.S. Cl. .......................... 340/539.32; 340/539.11; 340/539.13; 340/539.2; 340/988; 340/990; 340/995.17; 340/995.18
(58) Field of Classification Search ........... 340/539.32, 340/539.13, 539.2, 988–995.25, 995.28, 340/932.1, 539.11; 701/213
See application file for complete search history.

(56) References Cited

U.S. PATENT DOCUMENTS

| 4,725,957 | A | * | 2/1988 | Alberter et al. ............ 701/224 |
| 5,731,785 | A | * | 3/1998 | Lemelson et al. ..... 342/357.07 |
| 5,745,866 | A | * | 4/1998 | Steiner ....................... 701/200 |
| 5,848,373 | A | * | 12/1998 | DeLorme et al. .......... 701/200 |
| 6,002,345 | A | * | 12/1999 | Ohmura et al. ............ 340/903 |
| 6,046,688 | A | * | 4/2000 | Higashikata et al. ... 340/995.27 |
| 6,125,326 | A | * | 9/2000 | Ohmura et al. ............ 701/213 |
| 6,341,254 | B1 | * | 1/2002 | Okude et al. ............... 701/208 |
| 6,360,169 | B1 | * | 3/2002 | Dudaney .................... 701/213 |
| 6,405,125 | B1 | * | 6/2002 | Ayed .......................... 701/200 |
| 6,489,921 | B1 | * | 12/2002 | Wilkinson ............. 342/357.08 |
| 6,553,308 | B1 | * | 4/2003 | Uhlmann et al. ........... 701/208 |
| 6,617,980 | B2 | * | 9/2003 | Endo et al. ................. 340/905 |
| 6,643,583 | B2 | * | 11/2003 | Volkel ........................ 701/208 |
| 6,785,607 | B2 | * | 8/2004 | Watanabe et al. .......... 701/200 |
| 6,791,477 | B2 | * | 9/2004 | Sari et al. .............. 340/825.36 |
| 6,871,144 | B1 | * | 3/2005 | Lee ............................. 701/213 |
| 6,873,257 | B2 | * | 3/2005 | Maloney et al. ....... 340/539.21 |
| 2002/0040271 | A1 | * | 4/2002 | Park et al. .................. 701/209 |

FOREIGN PATENT DOCUMENTS

| JP | 8065746 | 3/1996 |
| JP | 2000-194993 | 7/2000 |
| JP | 2000-261860 | 9/2000 |
| JP | 2002-56940 | 2/2002 |
| WO | WO 01/99369 | 12/2001 |

OTHER PUBLICATIONS

Japanese Patent Office Notice for Reason for Rejection, Dated Jul. 13, 2004.
Japanese Patent Office Notice for Reason for Rejection, May 10, 2005.

* cited by examiner

*Primary Examiner*—Benjamin C. Lee
*Assistant Examiner*—Son Tang
(74) *Attorney, Agent, or Firm*—Pillsbury Winthrop Shaw Pittman LLP

(57) ABSTRACT

A cellular phone places a call to vehicle navigation apparatus, performs ID matching, and acquires the information on the position of the vehicle measured by the vehicle navigation apparatus. The cellular phone acquires peripheral map data including the position of the owner of the vehicle and the position of the vehicle where the vehicle navigation apparatus is mounted from a position information center and displays the data acquired together with the data on the positions.

5 Claims, 10 Drawing Sheets

| RANGE OF MEASURED AZIMUTH ANGLE | DISPLAY SCREEN | ARROW ICON |
|---|---|---|
| $345° \leq \theta < 15°$ | Deg0 |  |
| $15° \leq \theta < 45°$ | Deg30 |  |
| $45° \leq \theta < 75°$ | Deg60 |  |
| $75° \leq \theta < 105°$ | Deg90 |  |
| $105° \leq \theta < 135°$ | Deg120 |  |
| $135° \leq \theta < 165°$ | Deg150 |  |
| $165° \leq \theta < 195°$ | Deg180 |  |
| $195° \leq \theta < 225°$ | Deg210 |  |
| $225° \leq \theta < 255°$ | Deg240 |  |
| $255° \leq \theta < 285°$ | Deg270 |  |
| $285° \leq \theta < 315°$ | Deg300 |  |
| $315° \leq \theta < 345°$ | Deg330 |  |

| RANGE OF MEASURED AZIMUTH ANGLE | DISPLAY SCREEN | VEHICLE ICON |
|---|---|---|
| 345° ≤ θ < 15° | Deg0 |  |
| 15° ≤ θ < 45° | Deg30 |  |
| 45° ≤ θ < 75° | Deg60 |  |
| 75° ≤ θ < 105° | Deg90 |  |
| 105° ≤ θ < 135° | Deg120 |  |
| 135° ≤ θ < 165° | Deg150 |  |
| 165° ≤ θ < 195° | Deg180 |  |
| 195° ≤ θ < 225° | Deg210 |  |
| 225° ≤ θ < 255° | Deg240 |  |
| 255° ≤ θ < 285° | Deg270 |  |
| 285° ≤ θ < 315° | Deg300 |  |
| 315° ≤ θ < 345° | Deg330 |  |

VEHICLE POSITION COMMUNICATION SYSTEM, VEHICLE NAVIGATION APPARATUS AND PORTABLE COMMUNICATIONS APPARATUS

BACKGROUND OF THE INVENTION

The present invention relates to a vehicle position communication system which notifies the vehicle's owner of the position of the vehicle, and vehicle navigation apparatus and portable communications apparatus used for the system.

In case the vehicle's owner has parked a vehicle in a large parking lot of for example a theme park, it sometimes happens that he/she has forgotten the parking position of the vehicle on his/her way back to the vehicle. In case the vehicle has been stolen, it is almost impossible to detect a place where the vehicle is gone.

In the related art, a service has been put to use which monitors information from a sensor attached inside a vehicle at the center facility and transmits the information on the position of the vehicle or information concerning theft of the vehicle to the cellular phone of the vehicle's owner. The owner who receives this service can display the current position of the vehicle on the display panel of his/her cellular phone.

However, in a related art vehicle position communication system, it is necessary to mount specific apparatus including a GPS unit.

SUMMARY OF THE INVENTION

The object of the invention is to provide a vehicle position communication system which is capable of displaying the information on the position of a vehicle on portable communications apparatus without adding new apparatus, by taking advantage of vehicle navigation apparatus mounted on the vehicle.

In order to solve the aforesaid object, the invention is characterized by having the following arrangement.

(1) A vehicle position communication system comprising:
  a portable communications apparatus; and
  a vehicle navigation apparatus mounted on a vehicle for measuring a position of the vehicle and displaying the measured position on a display panel, the vehicle navigation apparatus including,
    a communications module for communicating with the portable communications apparatus in response to a call from the portable communications apparatus, and
    a controller for comparing an ID entered on the portable communications apparatus with a registered ID before start of communications with the portable communications apparatus to determine whether transmission of position information is allowed, and transmitting to the portable communications apparatus the information on the measured position when it is determined that the transmission of position information is allowed.

(2) The vehicle position communication system according to (1), wherein the portable communications apparatus calls the vehicle navigation apparatus so as to register an arbitrary ID with the vehicle navigation apparatus.

(3) The vehicle position communication system according to (1), further comprising a position information center storing a map database and connectable to the portable communications apparatus and the vehicle navigation apparatus,
  wherein the position information center acquires the information on the position of the vehicle measured by the vehicle navigation apparatus,
  wherein the portable communications apparatus includes a positioning unit and transmits information acquired by the positioning unit to the position information center, and
  wherein the position information center creates peripheral map information including the position of each of the vehicle navigation apparatus and the portable communications apparatus with reference to the map database, based on the information received from the portable communications apparatus and the information on the vehicle measured by the vehicle navigation apparatus, and transmits the created peripheral map information to the portable communications apparatus.

(4) The vehicle position communication system according to (3), wherein
  the portable communications apparatus comprises a GPS as the positioning unit and transmits measurement data from the GPS to the position information center, and
  the position information center measures the position of the portable communications apparatus based on the measurement data and transmits the obtained position information to the portable communications apparatus.

(5) A vehicle navigation apparatus mounted on a vehicle for measuring a position of the vehicle and displaying the measured position on a display panel, the vehicle navigation apparatus comprising:
  a communications module for communicating with a portable communications apparatus in response to a call from the potable communications apparatus; and
  a controller for comparing an ID entered on the portable communications apparatus with a registered ID before start of communications with the portable communications apparatus to determine whether transmission of position information is allowed, and transmitting to the portable communications apparatus the information on the measured position when it is determined that the transmission of position information is allowed.

(6) A portable communications apparatus comprising:
  a display unit which acquires and displays information on a position of a vehicle measured by a vehicle navigation apparatus when the vehicle navigation apparatus mounted on the vehicle is called and it is determined that the vehicle navigation apparatus can communicate with the portable communications apparatus based on a result of comparison of an entered ID with an ID registered with the vehicle navigation apparatus.

(7) The portable communications apparatus according to (6) further comprising a positioning unit and a transmitting unit which transmits information acquired by the positioning unit to the position information center,
  wherein the display unit receives peripheral map information created in a position information center based on the information acquired by the positioning unit and the information on the position of the vehicle measured by the vehicle navigation apparatus and displays on the display unit the information received together with the position of the portable communications apparatus and the position of the vehicle navigation apparatus.

(8) A vehicle position communication system comprising:
  a portable communications apparatus which acquires measurement data; and
  a vehicle navigation apparatus mounted on a vehicle, which measures and acquires a position of the vehicle as position data;

a position information center connectable to the portable communications apparatus and the vehicle navigation apparatus, and stores map database, wherein the position information center receives the measurement data and the position data of the vehicle, create map data including the position of the portable communications apparatus and the vehicle navigation apparatus with reference to the map database based on the measurement data and the position data of the vehicle, and transmits the created map data to the portable communications apparatus.

(9) The vehicle position communication system according to (8), wherein the position data acquired by the vehicle navigation apparatus is transmitted to the position information center through the portable communications apparatus.

(10) The vehicle position communication system according to (8), wherein the portable communications apparatus includes a GPS module, and the measurement data acquired by the portable communications apparatus is measured by the GPS module.

(11) A portable communications apparatus comprising:

an acquiring unit for acquiring measurement data;

a communication module for transmitting the acquired data to a position information center, communicating with a vehicle navigation apparatus installed in a vehicle, and receiving, from the position information center, map data including a position of the portable communications apparatus and a position of the vehicle; and a display for displaying the received map data.

(12) The portable communications apparatus according to (11), wherein the communication module receives position data representing a current position of the vehicle from the vehicle navigation apparatus and transmits the position data to the position information center.

(13) A position information center comprising:

a receiver for receiving measurement data acquired by a portable communications apparatus and position data representing position of a vehicle acquired by a vehicle navigation apparatus installed in the vehicle;

a creating device for creating map data including a position of the portable communications apparatus and a position of the vehicle with reference to map database based on the measurement data and the position data of the vehicle.

The present disclosure relates to the subject matter contained in Japanese patent application No. 2002-052213 (filed on Feb. 27, 2002), which is expressly incorporated herein by reference in their entireties.

DETAILED DESCRIPTION OF PREFERRED EMBODIMENTS

Figure 1:
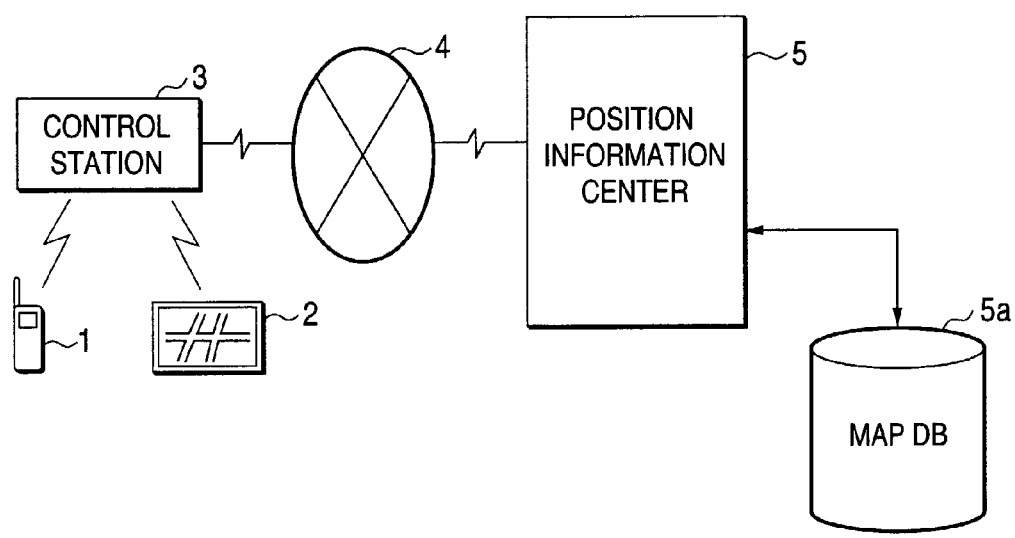
FIG. 1 is a general block diagram of a vehicle position communication system according to an embodiment of the invention.

A vehicle position communication system according to an embodiment of the invention includes vehicle navigation apparatus, a cellular phone as an example of portable communications apparatus connectable to the vehicle navigation apparatus via a telephone line, and a position information center connectable to the cellular phone and the vehicle navigation apparatus via a telephone line. FIG. 1 is a general block diagram of a vehicle position communication system of the invention. A cellular phone 1, vehicle navigation apparatus 2, and a position information center 5 are mutually connectable via a line control station 3. A numeral 4 denotes the Internet. The position information center 5 includes a map database 5a which stores plenty of map data representing maps for each region and is described later.

The vehicle navigation apparatus 2 incorporates a GPS (Global Positioning System) module. The vehicle navigation apparatus 2, mounted on a vehicle, measures the position of the vehicle and displays its position together with a peripheral map on the display panel. The vehicle navigation apparatus 2 further includes a communications module for communicating with the cellular phone 1 in response to a call from the cellular phone 1.

The cellular phone 1 incorporates a GPS like the vehicle navigation apparatus incorporating the GPS, and has a feature for measuring its position by way of the D-GPS (differential GPS positioning system). As a fixed station of the D-GPS, a position information center 5 is used. That is, the cellular phone itself does not perform positioning based on the measurement data from the GPS but transmits the measurement data to the position information center 5, which performs high-accuracy positioning calculation operation and transmits the result to the cellular phone 1. By doing so, the positioning calculation operation on the cellular phone 1 is made unnecessary thus reducing the load on the calculation operation section as well as enhancing the positioning accuracy and positioning time. In order for the D-GPS service to be available, the position information center 5 as a fixed station must be within several tens of kilometers from the cellular phone 1. Recently, single-handed positioning provides a sufficient accuracy so that the D-GPS is no longer a prerequisite. This provides an advantage that a cellular phone does not have to transmit GPS measurement data to the position information center 5.

The position information center 5 determines the current position of each of the cellular phone 1 and the vehicle navigation apparatus 2 by connecting to the cellular phone 1 and the vehicle navigation apparatus 2.

The cellular phone 1, vehicle navigation apparatus 2 and position information center 5 will be described with reference to FIGS. 2 through 4.

Figure 2:
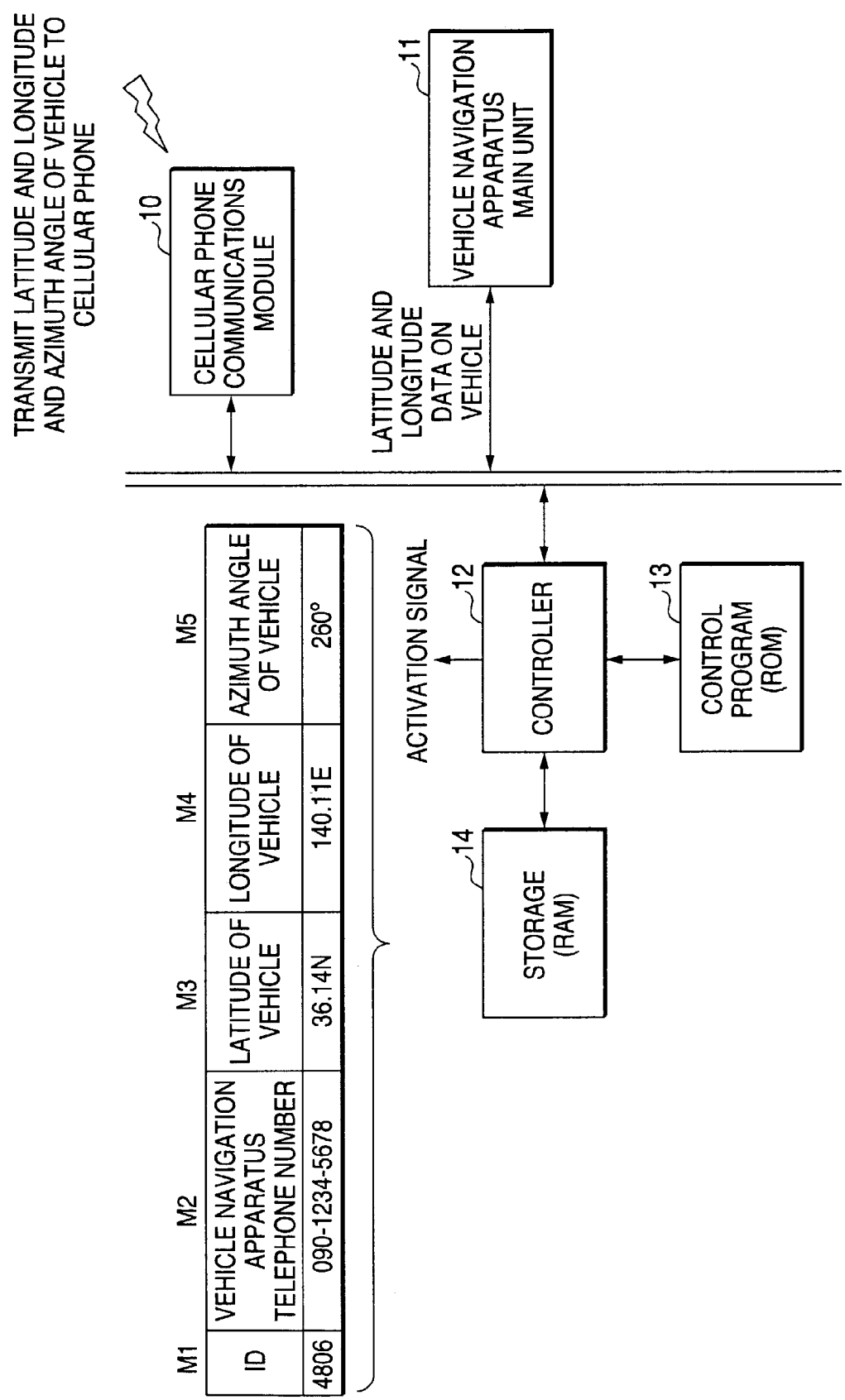
FIG. 2 is a general block diagram of vehicle navigation apparatus.

FIG. 2 is a general block diagram of the vehicle navigation apparatus 2.

The vehicle navigation apparatus 2 includes a cellular phone communications module 10 and a vehicle navigation apparatus main unit 11. The vehicle navigation apparatus main unit 11 includes a GPS and an electronic compass module. The vehicle navigation apparatus main unit generates the data on the current position (latitude and longitude data) of the vehicle and displays the data obtained together with the peripheral map data on an LCD panel (not shown). The cellular phone communications module 10 communicates with the cellular phone 1 in response to a call from the cellular phone 1. The cellular phone communications module 10 is used to transmit the current position of the vehicle measured by the vehicle navigation apparatus main unit 11 to the cellular phone.

The cellular phone communications module 10 and the vehicle navigation apparatus main unit 11 are controlled by a controller 12. The control program for control is stored in a ROM 13. A RAM 14 stores, as shown in the figure, five types of data, that is, "ID" (Area M1), "telephone number of the vehicle navigation apparatus" (Area M2), "latitude of the vehicle" (Area M3), "longitude of the vehicle" (Area M4) and "azimuth angle of the vehicle" (Area M5).

The ID is compared with the ID entered on the cellular phone 1 before starting communications with the cellular phone 1. In the shown example, a number 4806 is registered as an ID. When the number 4806 is entered on the cellular phone before communications with the cellular phone 1, an ID match occurs and it is determined that the current position of the vehicle can be transmitted to the cellular phone 1. The "telephone number of the vehicle navigation apparatus" is a telephone number used for a call from the cellular phone 1. The "latitude of the vehicle" and the "longitude of the vehicle" are current position of the vehicle measured by the vehicle navigation apparatus main unit 11. The "azimuth angle of the vehicle" is the azimuth angle of the vehicle measured by an electronic compass. The azimuth angle of the vehicle is an angle showing the azimuth of the vehicle relative to the north cardinal point.

Figure 3:
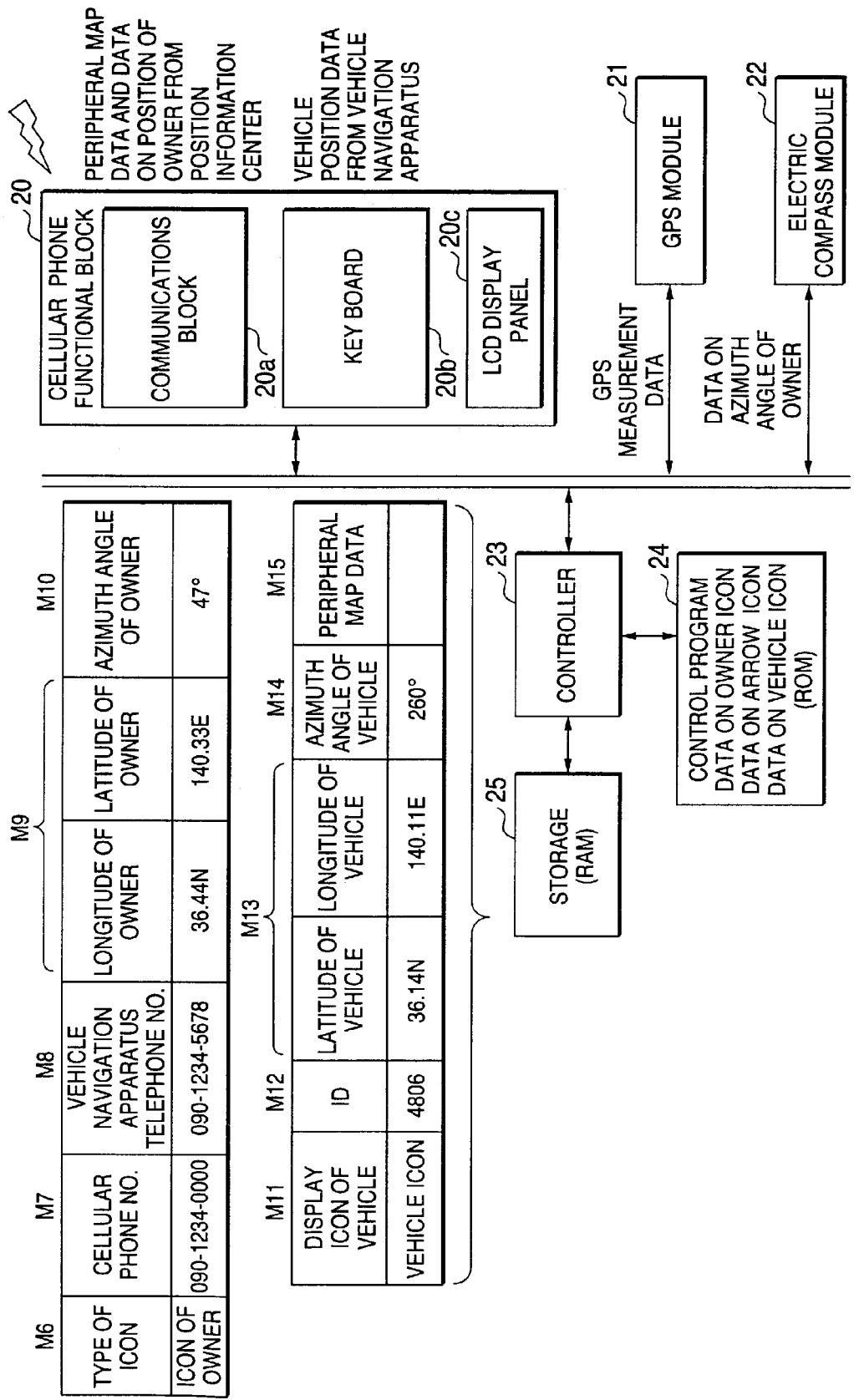
FIG. 3 is a general block diagram of a cellular phone.

FIG. 3 is a general block diagram of a cellular phone 1.

The cellular phone 1 includes a cellular phone functional block 20, a GPS module 21, and an electronic compass module 22. The cellular phone functional block 20 includes a communications module 20*a* for communicating with the vehicle navigation apparatus 2 by calling the vehicle navigation apparatus 2, a keyboard 20*b*, and an LCD display panel 20*c*. The GPS module 21 acquires measurement data from the GPS. The electronic compass module 22 obtains the azimuth angle of the owner of the-vehicle.

A ROM 24 is connected to a controller 23 which controls the cellular phone functional block 20, GPS module 21 and electronic compass module 22. In the ROM 24, a control program, the vehicle owner icon data showing the position of the owner of the vehicle, vehicle icon data showing the angle of the orientation of the vehicle, and arrow icon data showing the travel direction are stored. The RAM 25 stores the "types of icons" (Area M6), "cellular phone number" (Area M7) and "vehicle navigation apparatus telephone number" (Area M8) to be displayed in the position of the owner of the vehicle, "latitude of the owner of the vehicle" and "longitude of the owner of the vehicle" (Area M9) representing the latitude and longitude of the owner of the vehicle measured, "azimuth angle of the owner of the vehicle" (Area M10) representing the azimuth angle of the owner of the vehicle measured, "vehicle icon" (Area M11) and "ID" (Area M12) representing the position of the vehicle, "latitude of the vehicle" and "longitude of the vehicle" (Area M13) representing the latitude and longitude of the vehicle measured, "azimuth angle of the vehicle" (Area M14) representing the azimuth angle of the vehicle, and "peripheral map data" (Area M15). Of the data, the vehicle owner icon and the vehicle icon are pre-selected from the shape data (not shown) in the ROM 24, that is, selected from among several shapes. The "azimuth angle of the owner of the vehicle" (Area M10) is used to select arrow icon data. The "azimuth angle of the vehicle" (Area M14) is used to select vehicle icon data.

The current position data concerning "latitude of the owner of the vehicle" and "longitude of the owner of the vehicle" is obtained by transmitting the GPS measurement data to the position information center 5 and receiving the result of accurate positioning calculation operation performed by the position information center 5. The data concerning "latitude of the vehicle," "longitude of the vehicle" and "azimuth angle of the vehicle" is transmitted from the vehicle navigation apparatus 2. The "peripheral map data" is transmitted from the position information center 5.

In this configuration, the owner of the cellular phone 1 calls the vehicle navigation apparatus 2, and inputs the initial ID value by the keyboard to register the cellular phone 1 with Area M1 of the RAM 14 of the vehicle navigation apparatus.

Next, when the owner of the cellular phone 1 seeks to display his/her position and the position of his/her vehicle on the LCD display panel of the cellular phone, the owner calls the vehicle navigation apparatus. When the vehicle navigation apparatus is called, the owner enters an ID on the cellular phone 1. When the entered ID matches the ID stored in Area M1 of the vehicle navigation apparatus, the vehicle navigation apparatus 2 transmits the data on the current position and the azimuth angle of the vehicle. The cellular phone automatically switches the destination to the position information center 5 and transmits the measurement data (data for positioning calculation operation) measured by a built-in GPS to the position information center 5 through the communication module for accurate positioning of the owner of the vehicle. At the same time, the cellular phone 1 transmits the data on the current position of the vehicle to the position information center 5 through the communication module. The position information center 5, receiving the data, measures the accurate position of the cellular phone based on the GPS measurement data transmitted from the cellular phone 1, creates peripheral map data including the resulting latitude/longitude data and data on the current position of the owner of the vehicle transmitted based on such data referring to a map database 5*a*, and transmits the peripheral map data to the cellular phone 1. The cellular phone 1 overlays the arrow icon data selected based on the azimuth angle of the owner of the vehicle in Area M10, vehicle icon data selected based on the azimuth angle of the vehicle in Area M14 and the pre-selected vehicle owner icon data on the peripheral map data transmitted from the position information center 5, and displays the resulting image on the LCD display panel 20*c*.

Figure 4:
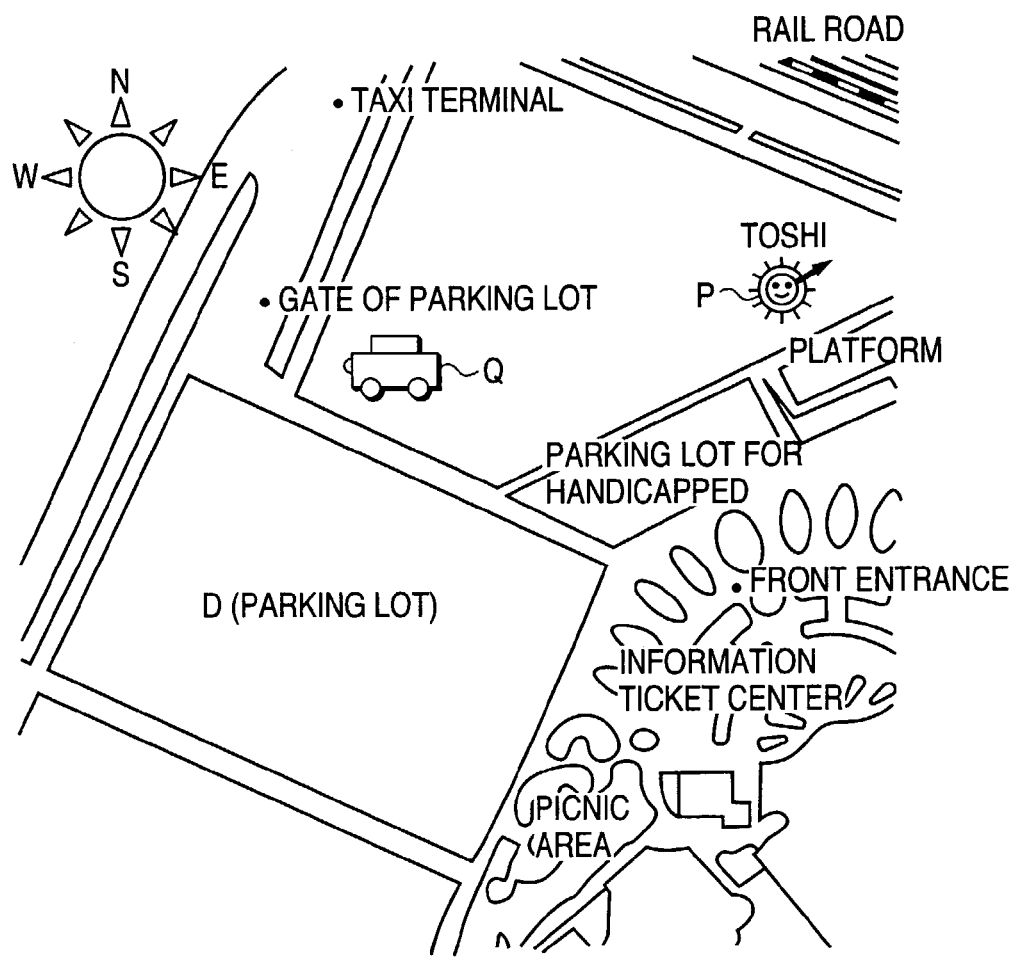
FIG. 4 shows an example of the cellular phone.

Thus, the image is displayed on the LCD display panel 20*c* of the cellular phone 1, for example, as shown in FIG. 4. In FIG. 4, an icon P is an icon of the owner of the vehicle having the cellular phone and indicates the position of the owner of the vehicle. An icon Q is a vehicle icon indicating the vehicle and selected based on the azimuth angle of the vehicle in Area M14. The vehicle icon indicates the azimuth of the vehicle. A map including the position of the icon P and the icon Q is displayed as the background. An arrow overlaid on the icon P corresponds to arrow icon data selected based on the azimuth angle of the owner of the vehicle in Area M10. The direction of the arrow corresponds to the direction in which the cellular phone is oriented, or travel direction of the owner of the vehicle.

As shown in FIG. 4, by using the vehicle navigation apparatus 2 mounted on the vehicle, it is possible to display a map including the position of the owner of the vehicle and the parking position of the vehicle on the cellular phone 1 of the owner of the vehicle as well as display the position of the vehicle and the position of the owner of the vehicle at the same time. The position information center 5 determines the scale so that the icon P and icon Q will appear at the same time on the LCD display panel 20c of the cellular phone 1 before creating the map data. By doing so, the workload of scrolling through the LCD panel of the cellular phone 1 is eliminated and arrangement otherwise necessary is not required.

Then, the operation of the entire vehicle position communication system will be described with reference to FIG. 5 and the subsequent drawings.

Figure 5:
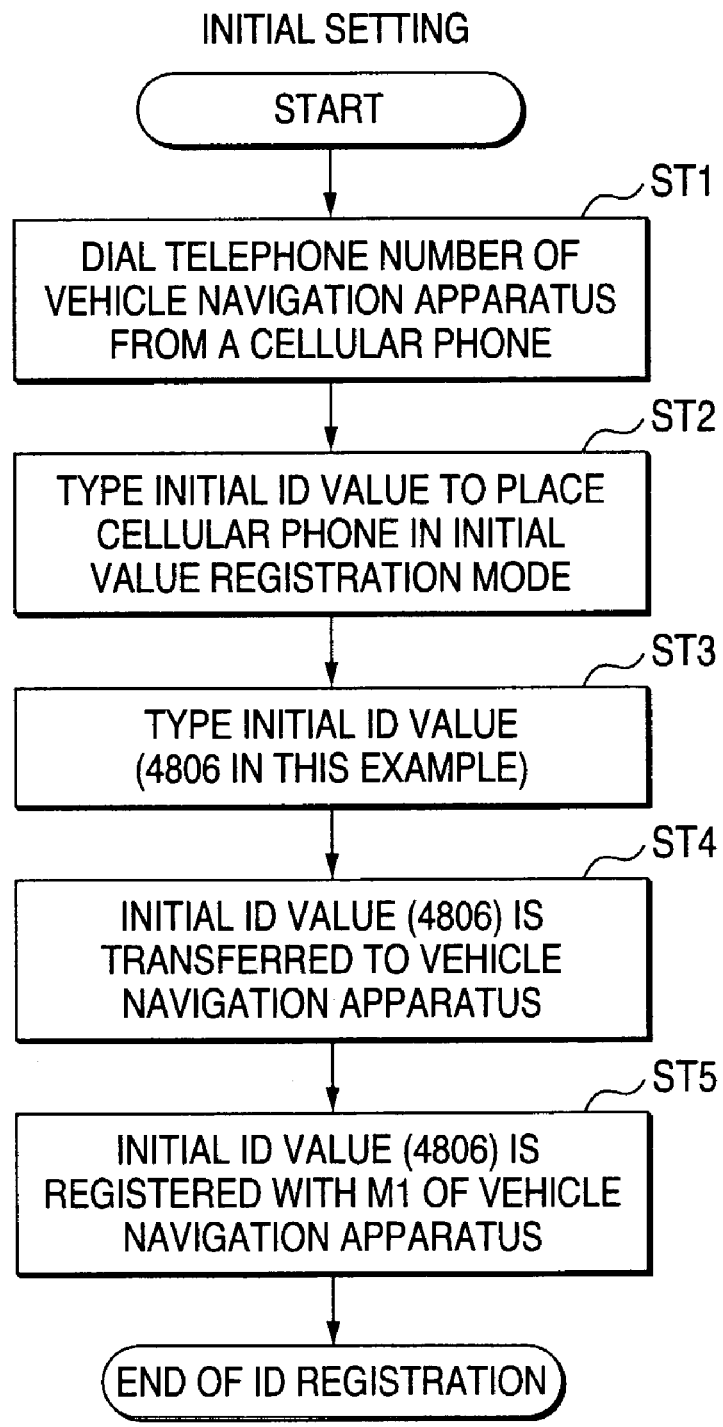
FIG. 5 is a flowchart showing the sequence of initial setting of ID.

FIG. 5 shows the operation of initial setting of ID on the cellular phone 1.

Figure 7A:
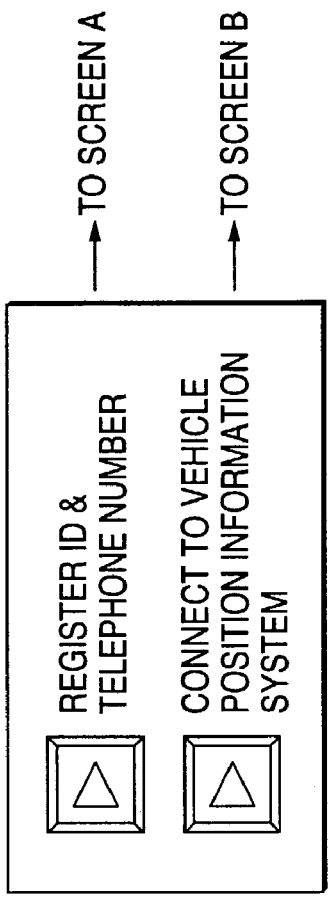
FIG. 7 shows the display sequence on the cellular phone.
Figure 7B:
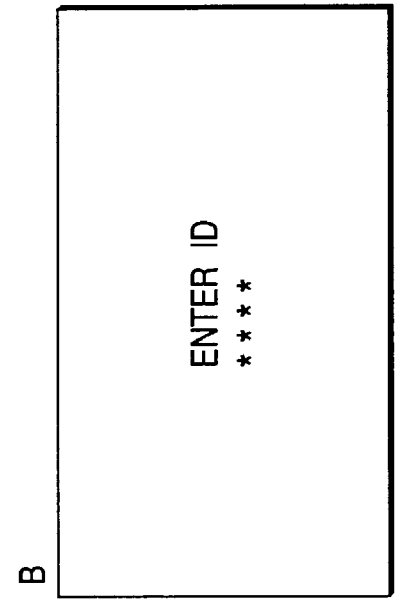
Figure 7C:
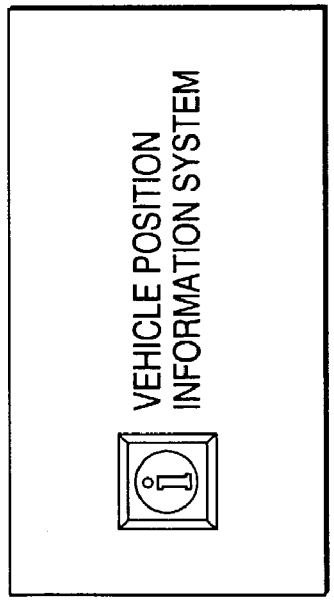
Figure 7D:
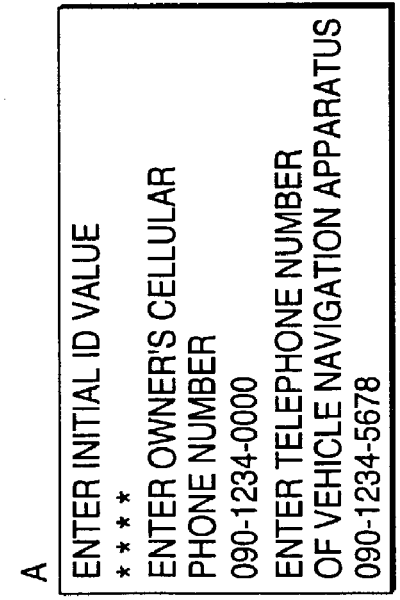

First, the owner of the vehicle places a call to the vehicle navigation apparatus 2 by using the cellular phone 1 (ST1). The telephone number of the vehicle navigation apparatus is registered with Area M8 of the RAM 25 on the cellular phone 1. When the call is established, the owner of the vehicle enters an initial ID value and places the cellular phone in the original ID registration mode (ST2). FIG. 7 shows this sequence. On the cellular phone 1, when the vehicle position information system is activated, the screen in FIG. 7A, then the screen in FIG. 7B appear. When the owner of the vehicle selects "Register ID & telephone number" Screen A in FIG. 7C appears. In Screen A, the owner of the vehicle enters the initial ID value as well as the telephone number of the local station cellular phone number (his/her own cellular phone number) in step ST3. The entered ID is stored into M12. The cellular phone number is pre-stored into M7. The telephone number of the vehicle navigation apparatus entered in Screen A of FIG. 7C is stored into M8.

The initial ID value typed in step ST3 is transferred to the vehicle navigation apparatus 2 in step ST4. The vehicle navigation apparatus 2 registers the initial ID value thus transmitted with M1 of the RAM 14 (ST5).

After registration, the initial ID value may be changed to an arbitrary value. In this case, the owner of the vehicle enters the currently registered ID, then a new ID. When the first ID is identical to the registered ID, the first ID is replaced with the second ID. By doing so, change of ID is possible only by a person who knows the ID, that is, the owner of the cellular phone. This prevents ID change via fraud.

Preferably, in the sequence of FIG. 5, verification of the owner of the cellular phone by any means is a prerequisite for registration of an initial ID value from the viewpoint of security.

Figure 6:
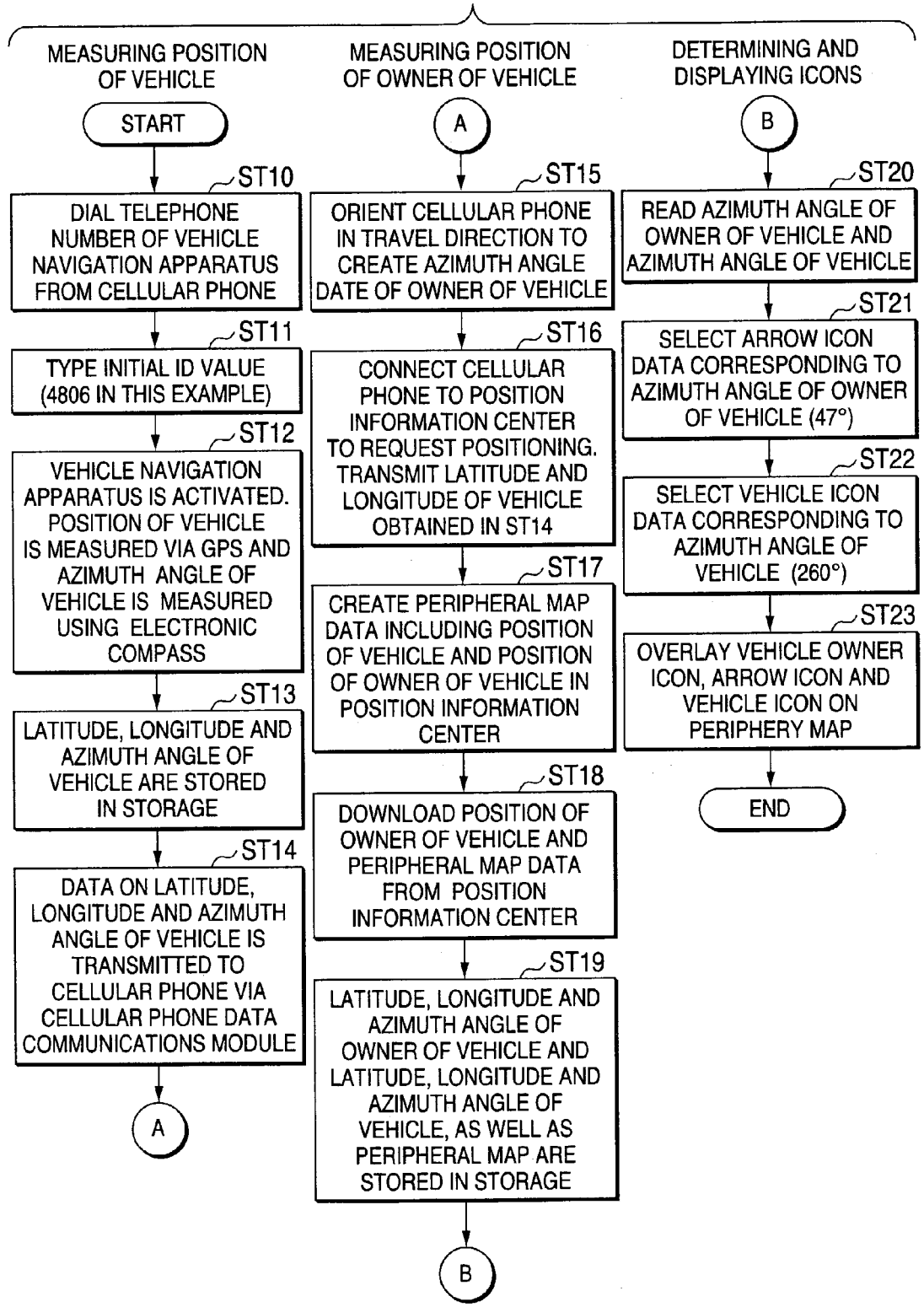
FIG. 6 is a flowchart showing the sequence of displaying the position of the owner of the vehicle and the position of the vehicle together with a peripheral map.

FIG. 6 is a flowchart showing the sequence of displaying the position of the owner of the vehicle and the position of the vehicle together with a peripheral map on the LCD display panel of the cellular phone 1.

In steps ST10 through ST14, the position of the vehicle is measured (positioning and measurement of azimuth angle). In steps ST15 through ST19, the position of the owner of the vehicle is measured (positioning and measurement of azimuth angle). In steps ST20 through ST23, the icons are determined and the position of the owner of the vehicle and position of the vehicle are displayed together with a peripheral map on the LCD panel 20c of the cellular phone.

First, the owner of the vehicle places a call to the vehicle navigation apparatus 2 by using the cellular phone 1 (ST10) When the vehicle navigation apparatus 2 is called, the owner of the vehicle enters an ID (4806 in this example) from a keyboard 20b. The display screen on the cellular phone is switched from the screen in FIG. 7A to the screen in FIG. 7B. When the owner selects "Connect to vehicle position information system", Screen B of FIG. 7D appears on the display screen and the owner enters an ID. The vehicle navigation apparatus 2 compares the ID transmitted from the cellular phone 1 with the ID stored in M1, and when a match occurs, the vehicle navigation apparatus 2 determines that communications is allowed between the vehicle navigation apparatus 2 and the currently connected cellular phone 1. In step ST12, the vehicle navigation apparatus 2 measures the position of the vehicle based on the GPS measurement data and uses an electronic compass to measure the azimuth angle. The data is stored into the areas M3 through M5 in the RAM 14 (ST13). Then the vehicle navigation apparatus 2 transmits the data on the current position of the vehicle (latitude and longitude) and the azimuth angle of the vehicle to the cellular phone 1 via the cellular phone communications module 10.

The owner of the cellular phone orients his/her cellular phone 1 in the travel direction (ST15). In this practice, an electronic compass module 22 measures the azimuth angle data of the owner of the vehicle. Next, the destination of the cellular phone 1 is automatically switched from the vehicle navigation apparatus 2 to the position information center 5. The cellular phone 1 transmits GPS measurement data to the position information center 5 to make a positioning request (ST16). At the same time, the cellular phone 1 transmits the data on the current position of the vehicle (latitude and longitude) to the position information center 5. The position information center 5, receiving a positioning request, performs positioning calculation operation based on the GPS measurement data. The position information center 5 also generates map data to be transmitted to the cellular phone 1 based on the data on the current position of the cellular phone (owner of the vehicle) obtained and the data on the current position of the vehicle transmitted (ST17). The map data which includes both the data on the latitude and longitude of the cellular phone 1 and the data on the latitude and longitude of the vehicle are created referring to the map database 5a.

The cellular phone 1 downloads the peripheral map data thus created and the data on the current position of the owner of the vehicle from the position information center 5 (ST18). The respective pieces of data are stored into M9 and M15 of the RAM 25 of the cellular phone (ST19). The data on the current position of the vehicle in M13 and the data on the azimuth angle of the vehicle are acquired from the vehicle navigation apparatus 2 in step ST14. The azimuth angle of the owner of the vehicle in M10 is the data measured by the built-in electronic compass module 22.

Figure 8:
FIG. 8 shows the arrow icon data stored in the RAM 25 of the cellular phone.
Figure 8:
Figure 8:
Figure 8:
Figure 8:
Figure 8:
Figure 8:
Figure 8:
Figure 8:
Figure 8:
Figure 8:
Figure 8:
Figure 9:
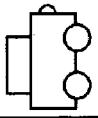
FIG. 9 shows the vehicle icon data stored in the RAM 25 of the cellular phone.
Figure 9:
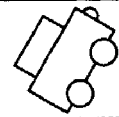
Figure 9:
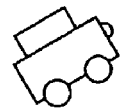
Figure 9:
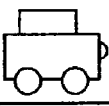
Figure 9:
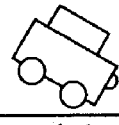
Figure 9:
Figure 9:
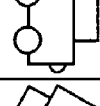
Figure 9:
Figure 9:
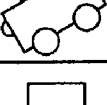
Figure 9:
Figure 9:
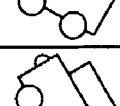
Figure 9:
Figure 10:
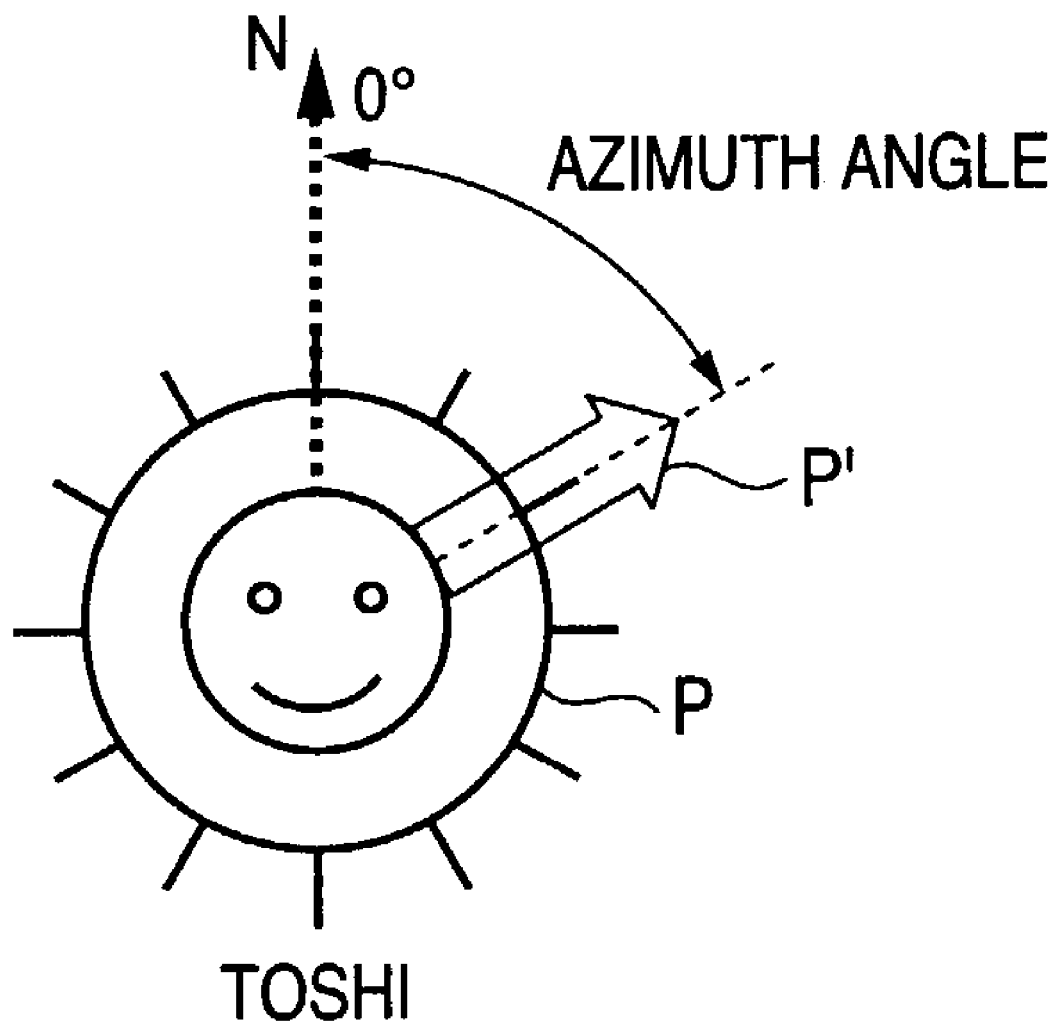
FIG. 10 shows the method for displaying the arrow icon.

Next, data on the azimuth angle of the owner of the vehicle in M10 and data on the azimuth angle of the vehicle in M14 are read (ST20). First, the arrow icon data corresponding to the azimuth angle of the owner of the vehicle is read from the ROM 24 (ST21). Next, the vehicle icon data corresponding to the azimuth angle of the vehicle is read from the ROM 24 (ST22). FIG. 8 shows the correspondence between the azimuth angle of the owner of the vehicle and the arrow icon data. FIG. 9 shows the correspondence between the azimuth angle of the vehicle and the rotation angle of the vehicle icon data. The arrow icon selected from FIG. 8 is displayed on a map in combination with the icon P indicating the position of the owner of the vehicle, as shown in FIG. 10. In FIG. 10, P' is the arrow icon. Display of the icon P and the icon P' is given north-up (the north is in upward direction). The travel direction may be displayed in upward direction instead of the north-up representation. The vehicle icon selected from FIG. 9 is displayed on the map.

While the vehicle navigation apparatus 2 transmits the data on the current position of the vehicle and the azimuth angle data to the cellular phone 1 in step ST14 in FIG. 6, this processing may be omitted and connection to the cellular phone may be released when the vehicle navigation apparatus 2 is activated and connection to the position information center 5 may be established to transmit the data to the position information center 5 in the preceding step ST12. In this case, it is not necessary to transmit the data to the position information center 5 in step ST16. Note that it is necessary to transmit the data together with the peripheral map data from the position information center 5 to the cellular phone 1 in step ST18.

The portable communications apparatus of the invention is not be limited to a cellular phone but may be a portable terminal having the communications feature such as a PDA.

According to the invention, even in case the owner of a vehicle has parked a vehicle in a large parking lot of for example a theme park, he/she can display the parking position and his/her position on portable communications apparatus away from the vehicle. Even in case the owner of the vehicle has forgotten the parking position of the his/her vehicle, he/she can readily check the parking position and his/her position.

In case the vehicle should be stolen, the owner of the vehicle can find the current position of his/her vehicle on portable communications apparatus at hand. The portable communications apparatus requires ID matching as a condition for displaying the position of the vehicle, thus preventing illegal use by an unauthorized person.

The portable communications apparatus can receive peripheral map and store the map in memory. This is convenient because the peripheral map is available at any time.

What is claimed is:

1. A portable communication apparatus comprising:
    a communications unit that communicates with a vehicle navigation system that is installed in a vehicle, the vehicle navigation system including a first Global Positioning System (GPS) unit and an electric compass:
    a storage that stores plural sets of icon data where each of the plural sets of icon data correspond to a predetermined range of an azimuth angle, respectively; and
    a display unit which displays, according to positional information that is detected by the first Global Position System unit of the vehicle navigation system and received through the communications unit from the vehicle navigation system, an icon which represents a position and a direction of the vehicle on a map based on one set of icon data, selected from the plural sets of icon data stored in the storage, according to an azimuth angle data that is detected by the electronic compass and received through the communications unit from the vehicle navigation apparatus;
    the portable communications further including a second Global Positioning System Unit,
    wherein the communications unit transmits information acquired by the second Global Position System unit of the portable communications apparatus to a position information center, and
    wherein the display unit receives peripheral map information created in the position information center based on the information acquired by the second Global Position System unit of the portable communications apparatus and the information on the position and the direction of the vehicle measured by the vehicle navigation apparatus and displays on the display unit an icon showing the position and the direction of the portable communications apparatus and the icon showing the position and the direction of the vehicle navigation apparatus.

2. The portable communications apparatus according to claim 1, wherein a scale of the map to be displayed on the display unit is determined so that the icon of the vehicle and the icon of the portable communications apparatus are displayed on a screen.

3. A portable communications apparatus comprising:
    a communications unit that communicates with a vehicle navigation apparatus, the vehicle navigation apparatus being provided with a first Global Positioning System unit and a first electric compass and installed in a vehicle;
    a second electric compass that detects azimuth angle information of the portable communications apparatus;
    a second Global Positioning System unit that detects positional information of the portable communications apparatus;
    a storage that stores plural sets of icon data where each of the plural sets of icon data correspond to a predetermined range of an azimuth angle, respectively;
    a display for displaying, according to positional information that is detected by the first Global Position System unit and received through the communications unit from the vehicle navigation apparatus, an icon showing a position and a direction of the vehicle based on one set of icon data selected from the plural sets of icon data stored in the storage according to azimuth angle information that is detected by a first electric compass and received through the communications unit from the vehicle navigation apparatus;
    wherein the communications unit transmits information acquired by the second Global Position System unit of the portable communications apparatus to a position information center, and
    wherein the display unit receives peripheral map information created in the position information center based on the information acquired by the second Global Position System unit of the portable communications apparatus, and an icon showing a position and a direction of the portable communications apparatus based on one set of icon data selected from the plural sets of icon data selected according to the positional information of the portable communications apparatus detected by the second Global Position System unit and the azimuth angle information of the portable communications apparatus detected by the second electric compass unit.

4. The portable communications apparatus according to claim 3, wherein the map displayed on the display unit is displayed based on map data downloaded from a positional information center connected to a network.

5. The portable communications apparatus according to claim 3, wherein a scale of the map displayed on the display unit is determined so that the icon showing the vehicle and icon showing the portable communications apparatus are simultaneously displayed on a screen of the display unit.

* * * * *